(12) United States Patent
Ottow

(10) Patent No.: US 6,423,116 B1
(45) Date of Patent: Jul. 23, 2002

(54) METHOD FOR EXTRACTING IRON BY DIRECT REDUCTION

(76) Inventor: Manfred Ottow, Walporzheimer Strasse 24, Berlin (DE), D-13465

( * ) Notice: Subject to any disclaimer, the term of this patent is extended or adjusted under 35 U.S.C. 154(b) by 0 days.

(21) Appl. No.: 09/509,172

(22) PCT Filed: Apr. 21, 1998

(86) PCT No.: PCT/DE98/01144
§ 371 (c)(1),
(2), (4) Date: Mar. 21, 2000

(87) PCT Pub. No.: WO98/48057
PCT Pub. Date: Oct. 29, 1998

(30) Foreign Application Priority Data

Apr. 21, 1997 (DE) .......................... 197 17 750

(51) Int. Cl.$^7$ .............................. C21B 13/00
(52) U.S. Cl. ...................................... 75/503
(58) Field of Search ............ 75/474, 475, 477, 75/476, 480, 481, 503, 504

(56) References Cited

U.S. PATENT DOCUMENTS

| | | | |
|---|---|---|---|
| 1,792,507 A | | 2/1931 | Percy |
| 1,832,731 A | | 11/1931 | Pardee |
| 1,863,804 A | | 6/1932 | Percy |
| 3,912,501 A | * | 10/1975 | De Castejon ............... 75/475 |
| 3,948,646 A | | 4/1976 | Pantke et al. .............. 75/34 |
| 4,116,678 A | * | 9/1978 | Lafont et al. ............... 75/475 |

FOREIGN PATENT DOCUMENTS

| | | |
|---|---|---|
| DE | 1 178 869 B | 10/1964 |
| DE | 1 201 377 B | 9/1965 |
| FR | 1 521 338 A | 7/1968 |
| FR | 2 049 293 A | 3/1971 |

* cited by examiner

*Primary Examiner*—Melvyn Andrews
(74) *Attorney, Agent, or Firm*—Young & Basile, P.C.

(57) ABSTRACT

The invention relates to a method and a device for extracting iron by direct reduction, characterized in that the device has a separate reduction chamber in which the carbon is gasified and the iron oxide is reduced in close proximity, and a separate combustion chamber in which surplus reduction gases are burned and heat energy is yielded. According to the invention, the hot combustion gasses pass on their heat energy to the reduction gasses in a heat exchanger, so that this energy is transferred to the reduction gases effectively. The reduction gasses are force-circulated through the heat exchanger and through the carbon/bed of ore for this purpose.

12 Claims, 4 Drawing Sheets

METHOD FOR EXTRACTING IRON BY DIRECT REDUCTION

BACKGROUND OF THE INVENTION

The present invention relates to a method and a device for the direct reduction of iron ore with coal.

Such methods and devices are employed in the production of iron or steel from iron ore, ie in metallurgy for example.

The methods applied for by far the greatest part of iron production from ore utilise the carbon in coal or coke for two processes which proceed simultaneously.

Carbon acts first of all as a chemical reducing agent and takes over the oxygen from the iron oxide.

Secondly, by combustion with oxygen (usually from the air) carbon supplies the necessary heat for the process.

For the best utilisation of the coal each of these two process steps requires thermodynamic conditions which are mutually exclusive ("thermodynamic dilemma").

For the reduction, the chemical potential of the oxygen in the atmosphere must be as low as possible, ie high CO content, low $CO_2$ content and low $O_2$ content in equilibrium with CO.

For the most complete possible combustion of the carbon to $CO_2$, an $O_2$ content in the combustion atmosphere meeting at least the stoichiometric requirements is needed.

In the coal reduction methods currently used in industry compromises are entered into. Accordingly, more energy is expended than is needed for the actual iron ore production process. At the same time the methods result either in reduction gas which does not have the full capability for reducing the oxide because before it is used for reduction the gas has already taken up oxygen by partial combustion or they result in the heat needed not being produced with optimum efficiency since the gas cannot be burned completely to $CO_2$.

Depending on the process, the unused portion of energy is dissipated in the form of carbon monoxide and hydrogen or as perceptible heat or both. The more or less advantageous use of the coupled product, energy, from these non-autothermic processes has a substantial effect on the economic efficiency of the overall process. In the blast furnace method the excess energy is given off in chemical form as furnace gas usually to usage loads located in the works. In the case of the rotary-tube furnace method the utilisation of the excess energy is difficult because frequently no usage loads are available. Occasionally the excess energy is converted to electrical energy.

SUMMARY OF THE INVENTION

In order to improve the energy yield in the context addressed here two routes have been taken. The compromise referred to has been improved or processes have been proposed which proceed without excess energy and are thus autothermic.

The characteristics of known methods affecting energy demand are here examined in more detail and compared.

For this purpose the RIST diagram in FIG. 1 is used. This shows on the abscissa the oxidation of the carbon as the molar ratio from O/C=0 to O/C=2, ie from carbon C to carbon dioxide $CO_2$, and on the ordinate the origin of the required oxygen with reference to one mol of Fe and thus expressed by the molar ratio O/Fe.

This oxygen taken up by the carbon can come from the ore (central region of the ordinate) or it can be free oxygen for precombustion (lower part) or afterburning (upper part). The terms precombustion and afterburning refer to the combustion of C or CO before and after, respectively, these have been used for reduction.

The removal of oxygen from the oxide illustrating the reduction becomes more clearly discernible if the number of mols of oxygen present in the oxide in question during the reduction process is always related to 1mol of iron instead of the conventional 1, 2 or 3 mols of iron. The following notations then emerge:

haematite, $Fe_2O_3$, becomes $FeO_{1.5}$;
magnetite, $Fe_3O_4$, becomes $FeO_{1.33}$; and
wüstite, FeO, becomes $FeO_{1.05}$.

The quantity of oxygen required for the combustion of a portion of the coal or CO (precombustion/afterburning) is also related to 1 mol of iron. Precombustion is given a negative sign and is plotted to −1.5. If, for example, 1.5 mols of oxygen/mol of Fe are needed for precombustion the diagram shows that just as much oxygen for precombustion as for reduction, ie 1.5 mol O per mol Fe in each case and thus 3 O/Fe in total, is removed from the reactor with the flue gas.

A to D are process lines for different reduction processes. The gradient of a process line, that is the quotient O/Fe/O/C, abbreviates to C/Fe the specific carbon consumption. The latter is particularly important for the deliberations pursued here and is specified in the legend of the figure for the methods under consideration both in terms of mol C/mol Fe and kg C/t Fe.

Process line B represents the exchange of oxygen between iron oxide and carbon as well as the further take up of oxygen by the carbon in afterburning for an ideal autothermic process for the production of directly reduced iron (DRI). The carbon demand is 1.4 mol C per mol Fe or 299 kg C/t Fe and is thus almost the lowest possible for a method based only on carbon for reduction and heat generation. The diagram shows that the reduction of the iron oxide oxidises the carbon completely to CO and beyond that converts 10% of it to $CO_2$. The remaining gas containing 90% of CO is afterburnt and the heat liberated covers the remaining enthalpy requirement of the reaction.

Process line A represents the rotary-tube method. The energy input required is greater than that for an autothermic process as can be seen from comparison of the gradients of the process lines. The actual energy demand for reduction in the rotary tube can naturally not be greater than that of an autothermic process but as a consequence of the process substantially more carbon must be fed in, that is to say 2.1 mol C/mol Fe, ie 451 kg C/t Fe, so that 152 kg C/t Fe are converted into heat lost in the process. The reason for this is that the CO formed in the reduction reaction must be burnt over the bed of coal and ore in order to generate the heat required for the Boudouard reaction. This combustion reaction, however, cannot be carried out completely to $CO_2$ because the $CO_2$ would impair the reduction process. It follows from this that any supply of heat without material separation of the gases in the reduction chamber and combustion chamber results for theoretical reasons in a consumption of carbon and energy which must be higher than that of a hypothetical autothermic process.

Process line C represents the oxygen exchange in a blast furnace operating only with coke. Due to the production of liquid end products as opposed to solid end products in processes A and B the consumption values have only limited comparability. In the blast furnace both precombustion (in the tuyere level) and afterburning (in the air heater) are employed. In the calculation of the carbon consumption the 0.2 C/Fe which leaves the furnace in the pig iron containing 4.3% C have already be subtracted.

Due to the partial combustion of the carbon in the tuyere level (precombustion) to produce the enthalpy needed for melting and heating the charge and for the Boudouard reaction the starting point of the process line is lowered by comparison with processes A and B from the origin of the coordinate system to −1.30 O/Fe. Due to this preliminary oxidation of the carbon the gas in the upper section of the blast furnace contains more $CO_2$ than originates from the reduction reaction. The gas is thus "diluted" with oxygen and is no longer as well suited for reducing as it would be without this take-up of oxygen. Accordingly, in contrast with A and B the process line C passes close to the "forbidden region" of the diagram marked by W and M. Since the compositions of the reducing gas lying in this region no longer result in the formation of metallic iron a process line cannot run through this zone.

Since the carbon consumption of the blast furnace is higher than that of an autothermic process possibilities for lowering the consumption could be sought. This would mean that the slope of the process line is reduced. However, it can immediately be seen from the diagram that this would only be possible if the point of intersection of the process line with the ordinate could be shifted upwards as a flatter process line would otherwise run into the "forbidden zone". This point of intersection, however, is fixed by the oxygen demand for precombustion and this in turn results from the heat demand for fusion and the other processes requiring heat in the lower part of the furnace. Since, however, the heat demand in the lower part of the furnace can only be reduced very slightly the process line can only be a little flatter without encroaching on the "forbidden zone" and hence the carbon consumption also can only be lowered by a small amount. Of course, this consideration does not exclude the substitution of carbon by other reducing agents.

Thus, in comparison with an autothermic process the higher carbon demand of the blast furnace and the chemical energy present in the furnace gas remain. The diagram shows that the $CO/CO_2$ ratio is 3/2. ⅓ of the furnace gas is burnt (afterburning) and after transfer through a regenerator the energy is reintroduced in the form of sensible heat to the combustion air by the tuyeres. ⅔ of the furnace gas leave the process with approximately 20% of the energy introduced in the form of coke.

The discussion of the blast furnace method has shown that although precombustion of the carbon is straightforward in technological terms it results in a position of the process line close to the "forbidden zone". Accordingly, the lowest possible slope of the process line and hence the lowest possible carbon consumption cannot be achieved with this method.

The methods can be divided into slow and rapid reduction processes in which the residence time of the charged material amounts to several hours. Processes in a blast furnace and in a rotary-tube furnace in which reduction and combustion to produce heat take place in the same chamber are considered to be slow reduction processes.

The Kinglor-Metor process and the Hoganes process have been proposed as slow autothermic reduction processes. In these processes a precombustion step takes place outside of the reduction chamber. The disadvantage of this method, however, is the low efficiency of the transfer of the heat produced by combustion back into the reduction chamber by thermal conduction. In this case the heat must first of all flow through a ceramic wall and then be conveyed onwards within the reactor by convection in an almost stagnant gas.

In another proposal (DE 39 28 415 A1) heat transfer from an external combustion chamber is effected via a heating duct system. On account of this slow type of heat transport the specific efficiencies of these process are low.

Rapid reduction processes are processes in which the residence time of the charged material is less than one hour, operations being conducted at elevated temperatures.

These processes include the Festmet process and the Inmetco process in which combustion takes place in the same chamber as reduction but both reactions proceed far apart from one another. It is intended in this manner that the two gas zones should mix as little as possible. The heat is transferred by radiation from the fire-resistant material in the combustion chamber heated by the combustion reaction into the reduction chamber, there being better heat transfer to the reduction chamber of the coal gasification. On account of the spatial conditions combustion cannot be carried on to complete conversion of CO to $CO_2$. Thus, these processes cannot be autothermic. Considerable excess energy is carried away out of the system.

The aim of the present invention is to provide a method for the extraction of iron by direct reduction of iron ore and a device for this purpose, the intention being that the process should be largely autothermic and accordingly should have a minimum specific coal consumption and energy consumption and that the reduction process should be rapid and capable of being carried out at a high temperature with the result that there is a high level of conversion of ore to metal.

This task is solved according to the invention by the characterising characteristics of the main claim and the coordinated claim in association with their introductory parts.

The use of a separate reduction zone and combustion zone for producing the necessary enthalpy of reduction for the gasification of the coal and the reduction of the iron allows a largely autothermic process in which the lowest possible amount of carbon is employed for reducing the iron. In the combustion chamber the carbon monoxide produced over and above that needed for reduction in the gasification of the coal is burnt and the heat liberated in doing so is transferred via a high-temperature heat exchanger to gas from the reduction chamber. A substantial improvement relative to the state of the art is the forced circulation of gas from the reduction chamber then through the heat exchanger and back into the reduction chamber as a result of which extremely efficient transfer of heat to the coal to be gasified and the iron ore to be reduced is effected. By using a high-temperature heat exchanger, that is a regenerator, in combination with the forced circulation of the reducing gas an autothermic direct reduction process of high specific efficiency is produced with which the throughput time for ores is lowered from hours to minutes.

According to the invention the heat is transferred by rapidly flowing gas to the ore/coal/pellets and, moreover, heat transfer takes place at high temperatures as a result of which the reduction time in the region of the rapid reduction process drops and can be lowered to 10 to 15 minutes. The degree of conversion of the ore to metal rises to over 90%.

By means of the measures specified in the subsidiary claims advantageous refinements and improvements are possible.

For the forced circulation it is suitable to use a fan, for example, which is connected to the heat exchanger and circulates the reducing gases through the heat exchanger. This is particularly advantageous when before they are conveyed through the heat exchanger and the fan the reducing gases are cooled by a cooler to temperatures of less than 300° C., for example, so that conventional fans can be used.

It is particularly advantageous to use a plurality of heat exchangers constructed as regenerators through each of which the hot combustion gases flow for a time, for example, and which are heated up after which the reducing gases previously cooled to 300° C. are then conveyed through the same regenerator. With the aid of suitable valve connections the heat of the combustion gases can be transferred particularly advantageously to the reducing gases by means of a cyclic sequence of heating and cooling processes of the regenerator or regenerators, only insubstantial quantities of oxygen passing from the waste gases into the reducing gases.

If four regenerators are employed simultaneously the essential heat exchange processes can be carried out synchronously for different spatial regions of the reduction chamber and in this way a particularly effective and rapid reduction of the iron can be achieved. The corresponding four steps for the optimum utilisation of the heat produced in the afterburning of the reducing gases are as follows.

a) Hot gas is drawn in from the combustion chamber by a regenerator and conveyed on to a waste gas unit. In doing so the combustion gas cools and the regenerator absorbs heat.

b) Cooled reducing gas is blown through the heated regenerator and heated to the working temperature of the reduction reactor. This heated reducing gas is blown back into the reducing chamber and in this way carries the required enthalpy of reaction to the coal and the iron ore.

c) This regenerator is cooled further by passing ambient air at room temperature through it and passing it on to the combustion chamber. In doing so the cold ambient air containing oxygen is preheated and this contributes to an improvement in the energy balance.

d) Gas is sucked out of the reduction chamber and through the regenerator which has now cooled almost to ambient temperature as a result of which it is strongly cooled. This cooled gas can then be passed on to a regenerator which carries out the step described under b).

It can immediately be seen that by using four regenerators simultaneously a four-phase process optimised in terms of time and energy can be carried out. Further variations of this method are also conceivable, for example the use of more or fewer regenerators, eg by dispensing with the preheating of the combustion air.

The method according to the invention and the device according to the invention are employed with particular advantage in a rotary-tube furnace.

BRIEF DESCRIPTION OF THE DRAWINGS

Examples of the method according to the invention and the device according to the invention are described below. These show.

DESCRIPTION OF THE PREFERRED EMBODIMENTS

Figure 1:
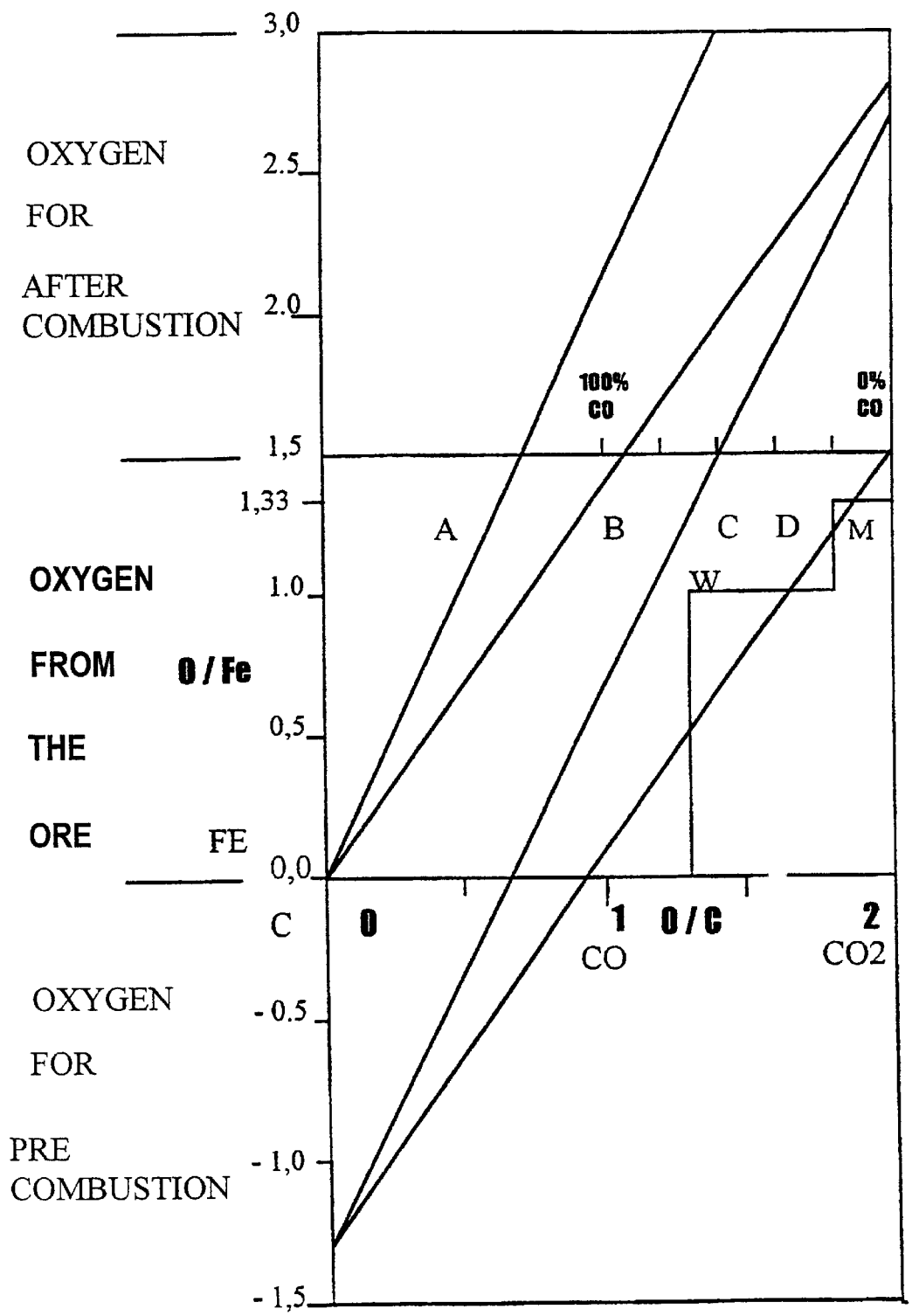
FIG. 1 a RIST diagram.

In the reduction of iron ore using coal the carbon and the other oxidisable constituents of the coal have two tasks:

1. a portion of them takes over the oxygen bonded to the iron in the ore (reduction);

2. the remainder reacts with free oxygen (usually from the air) in order to release the necessary enthalpy of reaction for the reduction reaction or the coal gasification reaction.

The two processes A and B are described stoichiometrically as follows.

A. Reduction with Carbon

Reduction of FeO (haematite) to Fe and conversion of 1.5 CO to 1.5 $CO_2$ $$FeO1.5 + 1.5\ CO = Fe + 1.5\ CO_2 \qquad 1.$$

Reaction of half of the resultant $CO_2$ with C (carbon gasification) to form 1.5 CO.

$$0.75\ CO_2 + 0.75\ C = 1.5\ CO. \qquad 2.$$

Thus according to equation 2 the quantity of CO needed for the reaction according to equation 1 is produced.

The overall equation for 1 and 2 is $$FeO1.5 + 0.75\ C = Fe + 0.75\ CO_2 + 118\ MJ/kmol. \qquad 3.$$

The reduction reaction according to equation 3 is not possible without constraints. On account of thermodynamic limits 10% of carbon monoxide must still be present in the consumed reduction gas in order for the reduction to proceed. This gives rise to a somewhat higher carbon demand. This is unimportant, however, for the general view. The calculations further on take all special thermodynamic features into consideration.

The following equation shows a further possibility for reduction by means of carbon:

$$FeO1.5 + 1.5\ C = Fe + 1.5\ CO + 247\ MJ/Fe. \qquad 4.$$

In order for the reduction with 1.5 C to proceed 247 MJ/Fe must be supplied to the reduction reactor compared with 118 MJ/Fe for reaction 3. In the industrial application a process results which operates between 3 and 4 but is closer to 4. In the autothermic method according to the invention both processes need the same amount of carbon but the heat to be transported across the system limits of the reduction and gasification reactor is different.

B. Combustion Reaction of Carbon or Carbon Monoxide with Free Oxygen

The combustion reaction can start from carbon:

$$x\ C + x\ O_2 = CO_2\ x'395\ MJ/kmol \qquad 5.$$

or in the case of coal gasification according to Eq 2 or 4 CO formed in excess is burnt:

$$y\ CO + y\ 1/2\ O_2 = y\ CO_2 - y'\ 284\ MJ/kmol. \qquad 6.$$

In the invention presented here the lowest values thermodynamically possible for x and y are achieved and, accordingly, the lowest possible input of fossil fuels is needed as energy.

In the method according to the invention the stream of materials resulting from the reaction of the oxygen of the ore with C, CO or $H_2$ is physically separated from the stream of materials emerging from the reaction of the free oxygen with C, CO or $H_2$.

In the transfer of the enthalpy required for the coal gasification and the reduction reaction using a heat exchanger it has to be taken into consideration that the coal gasification and the reduction of the iron oxides preferably proceed at solids temperatures of over 800° C. On account of the low specific heat of the gases the gas used as heat-transfer medium must be heated to the highest possible temperature, eg 1300° C., in order to transfer the considerable amount of heat required per ton of iron without the volume of gas to be circulated becoming too great. Since the usable enthalpy reserve of the heat-supplying gas is already exhausted at approximately 800° C. the gas must be withdrawn at this temperature from the reduction/gasification zone and be conveyed by a fan through a high-temperature heat exchanger or regenerator heated to approximately 1300° C. There is no fan which can assume this task for long periods. Accordingly, the gas drawn off at 800° C. must give off its enthalpy down to approximately 300° C. to a regenerator. The gas cooled in this way can now be conveyed without difficulty by a fan and be heated to 1300° C. by another heated regenerator.

Figure 2:
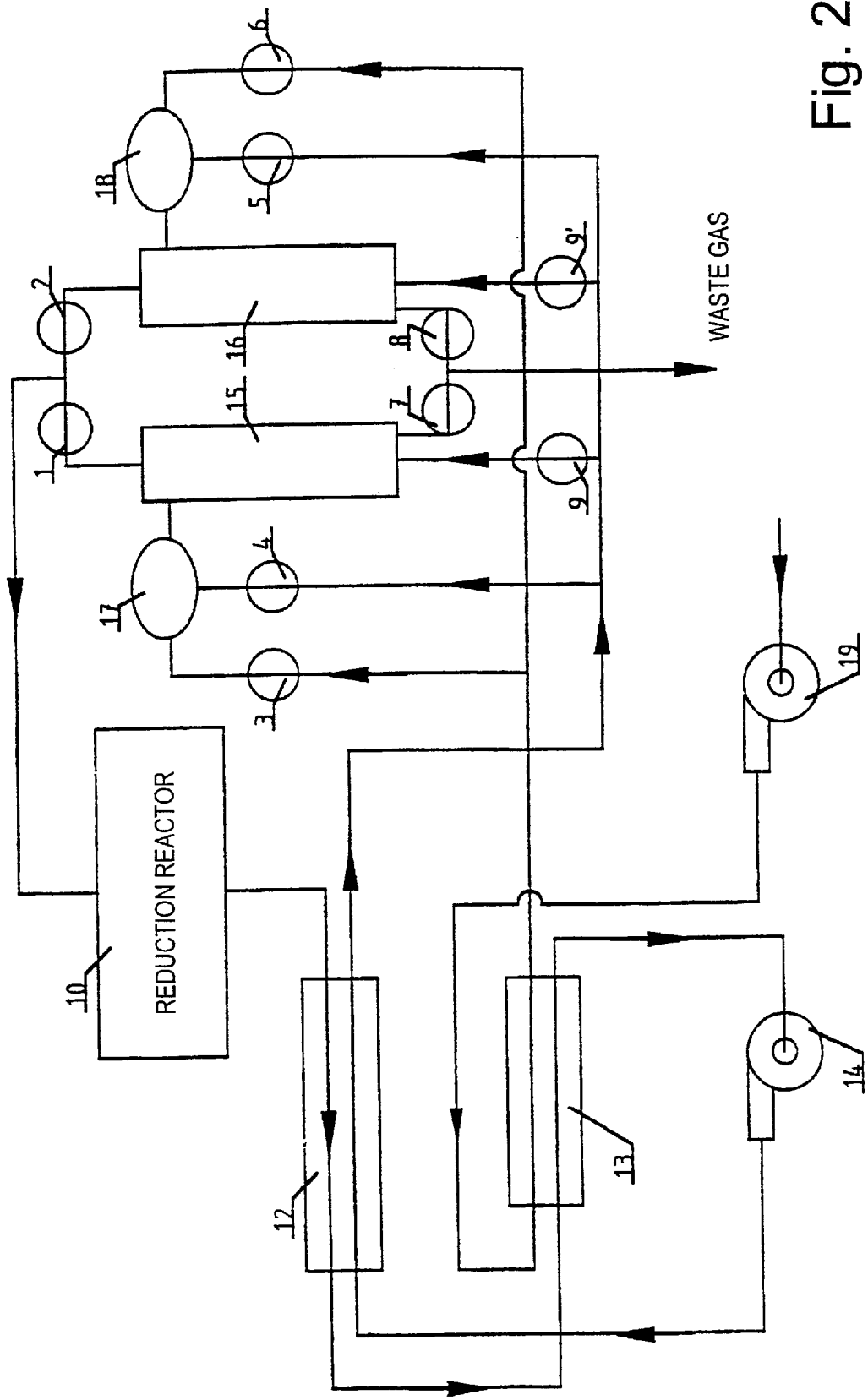
FIG. 2 a schematic illustration of a plant for carrying out the method according to the invention.

In FIG. 2 a schematic illustration of a plant for the rapid reduction of iron ore using coal under high-temperature conditions is shown which has a reduction reactor 10 constructed, for example, in the form of a rotary-tube reactor to which ore and coal are fed in a manner which is not illustrated. In FIG. 2 a bed 11 of ore/coal/pellets on a rotary grate or the like is shown. Recycling gas having a temperature above the initiation temperature of the Boudouard reaction (typically <950°C.) is carried into the reduction reactor 10. There a portion of the ore oxygen is reduced by reaction with the gas (indirect reduction) and furthermore by transfer from gas to coal the production of CO from $CO_2$ and C in accordance with the Boudouard reaction is brought about. The resulting CO reacts with ore oxygen (direct reduction) $CO_2$ being once more produced.

The reducing gas cooled to less than 900° C. is sucked by means of a fan 14 from the reduction reactor 10 via a combination of two heat exchangers 12, 13 or recuperators and flows through the fan 14 at approximately 300° C. The heat exchanger 12 gives the stored heat back to the gas after it emerges from the fan 14.

The plant further has two regenerators 15, 16 possessing heat storage members, ceramic spheres for example. Allocated to the regenerators 15, 16 are combustion chambers 17, 18 to which air is supplied via a fan 19 for the combustion of the reducing gas present in excess. Of course it is also possible to provide just one combustion chamber and this could be at a different position. For purposes of preheating the air is conveyed through the recuperator 13. The pipe system carrying the reducing gases is connected via valves 9, 9' and 4, 5 to the regenerators 15 and 16 and the combustion chambers 17 and 18. The air for the combustion chambers 17, 18 is conveyed from the recuperator 13 via valves 3, 6. The regenerators 15, 16 are further connected via valves 7, 8 to a waste gas pipe 20 and connected via valves 1 and 2 to the reduction reactor 10. The regenerators 15, 16 assume two states. In state one the valves 2, 3, 4, 7, 9' are closed while the valves 1, 5, 6, 9 are open. Approximately 80–90% of the reducing gas or recycling gas arrives in the regenerator 15 which gives up heat so that the recycling gas is heated to a temperature <1000° C., for example approximately 1300° C., and is fed back into the reduction chamber 10. The remaining portion (10–20%) of the reducing gas flows into the combustion chamber 18 in which it is burnt with the air and the heat produced heats the regenerator 16. The waste gas, in which both the ore oxygen as well as the oxygen coming from combustion leave the system, is carried off via the waste gas pipe 20. However, under no circumstances is combustion gas mixed with gas which is conveyed through the reduction reactor. In state 2 the regenerator 15 takes up heat produced by combustion in the combustion chamber 17 and the regenerator 16 gives up its heat to the reducing gas which is under forced circulation. In doing so the valves 2, 3, 4, 7 and 9' are open while the valves 1, 5, 6 and 8 are closed.

Figure 3:
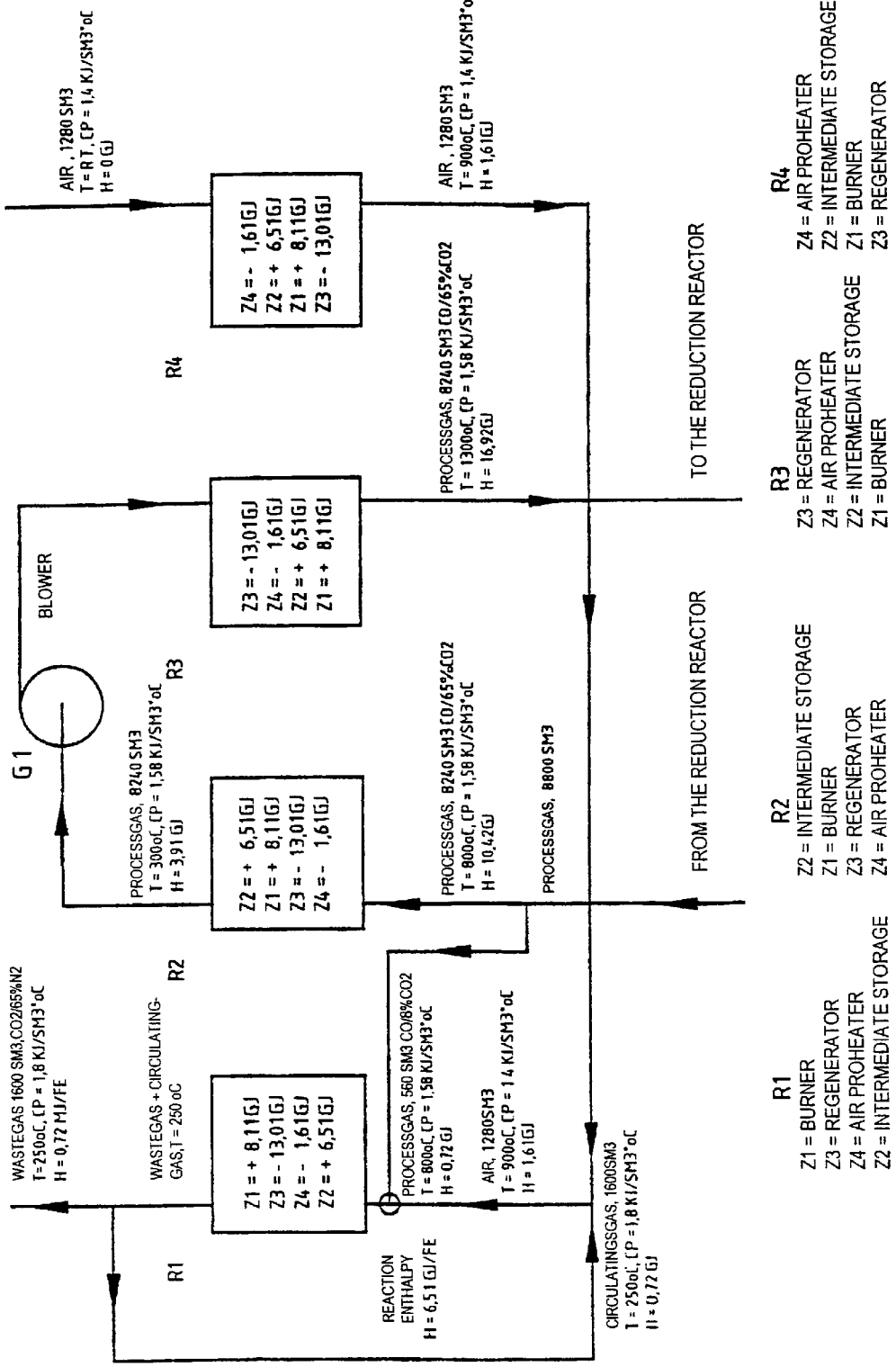
FIG. 3 a schematic illustration of the four-phase process according to the invention with four regenerators.

In FIG. 3 the scheme of four cyclically operating regenerators interconnected to form a set is shown. FIG. 3 shows how the four regenerators R1, R2, R3, R4 work together during the course of the four-phase cycle. Each regenerator R1, R2, R3 and R4 passes through the same sequence of four cycles Z1 to Z4. The figures given relate to the production of one ton of iron in the form of DRI. The conditions are presented as though the entire heat exchange for the production of this quantity of iron went through only one set of four heat exchangers. In a production plant having an annual capacity of 500,000 t of Fe pa one ton of iron is produced approximately every minute. It is then necessary to employ a whole series of such sets each comprising four regenerators on the reduction reactor. Rotary grate or travelling grate methods are particularly suitable for arranging a series of sets of regenerators along the reduction pathway and the pathway of the coal gasification proceeding at the same time. If for a plant of the aforesaid capacity twelve sets of regenerators are assumed in which each of the four regenerators has a refractory charge of 2 t for a changeover time of one minute the throughput figures specified in FIG. 3 are to be divided by 12 to obtain the values for one regenerator set.

FIG. 3 shows the four regenerators in one of four states Z1 to Z4. Regenerator R1 is in state Z1 and is just being acted upon by the hot burner gases (see lower lines of text). In doing so 560 sm3 of gas containing 92% $CO$/8% $CO_2$ are burnt with 1280 sm3 of air. Gas and air have admission temperatures of 800° C. and 900° C. respectively. Since the combustion gases would be too hot for regenerator R1 the combustion gases are mixed with 1600 sm3 of circulating waste gas at 250° C. In this state, therefore, the regenerator takes up 8.11 GJ.

Regenerator R2 is in state Z2 and as an intermediate accumulator it takes heat from the 8240 sm3 of process gas removed from the reduction reactor. The gas is cooled down from 800° C. to 300° C. so that it can be circulated by a fan G1. In doing so 6.5 GJ are given up to the regenerator R2.

The fan G1 conveys the gas cooled in R2 to be heated to the working temperature of 1300° C by regenerator R3 which is in state Z3. In the course of being heated the process gas removes 13.01 GJ from the regenerator. Due to the regeneration process the gas now has an enthalpy reserve of 6.5 1 GJ. This is the enthalpy requirement for a ton of iron produced by the reaction sequence A in FIG. 3 (363 MJ/Fe corresponds to 6.5 1 GJ/t Fe).

In state Z4 the regenerator R4 heats the combustion air for regenerator R1 to 900 ° C. using the enthalpy still left after the process gas has been heated. In doing so 1.61 GJ are withdrawn.

In the mode of operation described the heat balance of the regenerator system is balanced out. The process is autothermic and needs the lowest possible amount of coal. This is just sufficient to cover the reduction of the oxides and the other energy inputs still required: drying, calcining and sensible heat of the matrix and the iron. It was assumed for these that they would leave the reactor at 1150° C. In addition, a certain thermal loss and the enthalpy contained in the waste gas leaving the plant at 250° C. were taken into account.

The carbon demand can, however, be lowered further if the energy content of the coking gases from the coal, approximately 200 sm3/t of coal containing approximately 34 MJ/sm3, are utilised.

Figure 4:
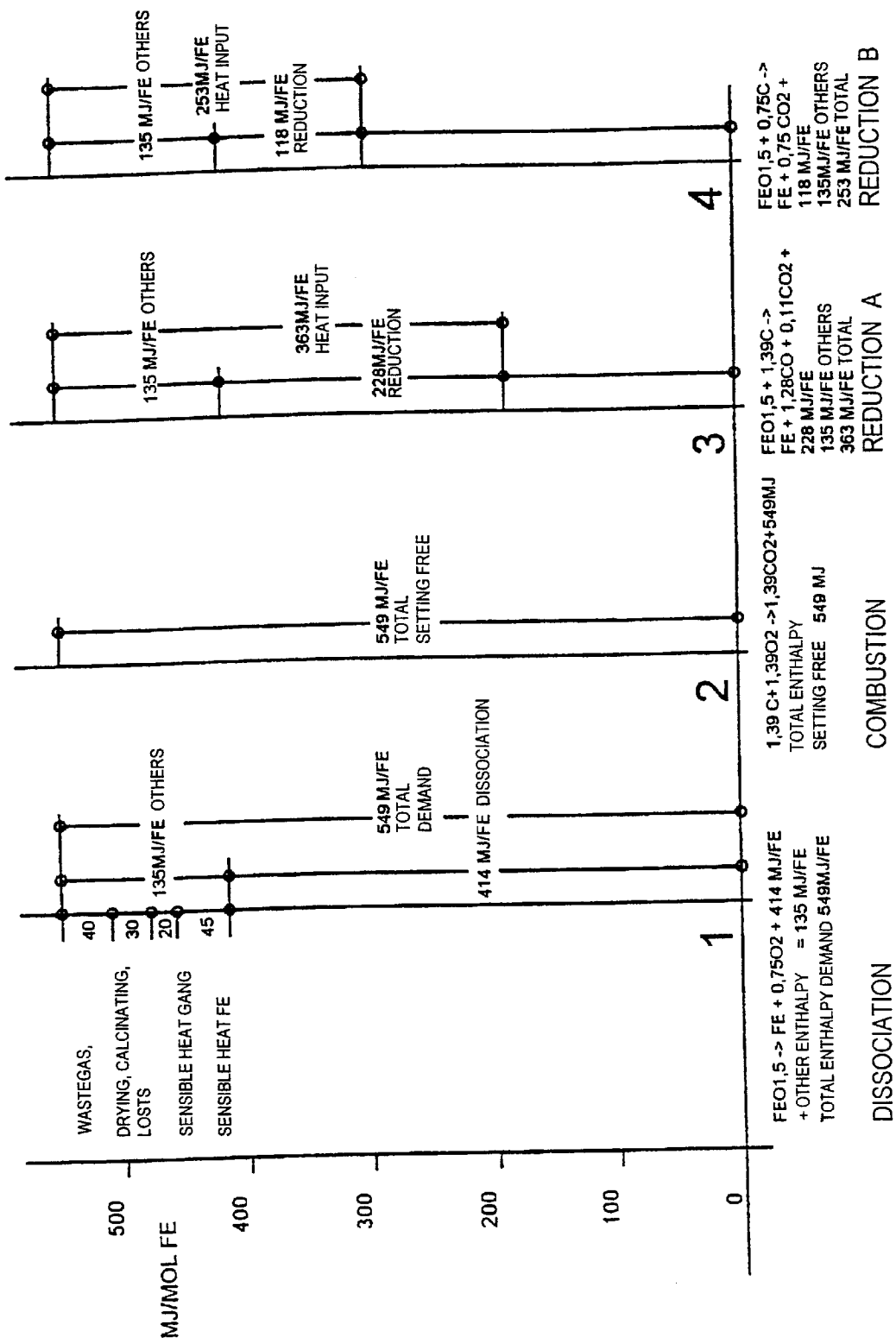
FIG. 4 the energy balance of a four-phase process according to the invention.

As FIG. 4 shows and as mentioned also in connection with equations 3 and 4, there are different possibilities for conducting an autothermic process while the carbon demand remains the same. These variants can all be carried out by the method according to the invention.

Section 1 in FIG. 4 shows the enthalpy demand (414 MJ/Fe) required for the breakdown (dissociation) of the iron oxide. Together with the enthalpy demand required for other things of 135 MJ/Fe this yields an overall demand of 549 MJ/Fe. In order to answer the question as to how much carbon is required to provide this enthalpy it is calculated how much carbon oxidised to $CO_2$ liberates this enthalpy. Section 2 of FIG. 4 shows that 1.39 mol of C is needed for this. Section 3 of FIG. 4 now shows what proportion of this 414 MJ/Fe or 549 MJ/Fe needed to prepare the iron must be transferred from the outside into the reduction or gasification reactor so that the reduction can run mainly via CO. Of the necessary 540 MJ/Fe, 363 MJ/Fe must be supplied from the outside. They are liberated by burning the CO produced in the reduction reaction in the combustion zone of the reactor and are transferred via regenerators.

The reduction illustrated in Section 4 of FIG. 4 also requires 549 MJ/Fe again but only 253 MJ/Fe must be transferred. The carbon demand for the reduction and further carbon for combustion occurring outside the reduction chamber amounts as in Section 3 of FIG. 4 to a total of 1.39 mol of C/Fe. As mentioned earlier, however, the reaction of Section 4 must be shifted slightly towards 3 to clear the thermodynamic hurdle. Thus in addition to the $CO_2$ approximately 10% of CO must be present in the waste gas.

An important conclusion of this examination of different reaction pathways for the same carbon demand is that for processes close to "4" less heat must be transferred through the regenerators into the reduction chamber. Since, however, the performance of a coal reduction reactor depends on the efficiency of the heat transfer, the throughput of a given plant can be raised by shifting the process from "3" to "4" by approximately 20%.

What is claimed is:

1. A method for the extraction of iron by direct reduction of iron ore using coal in a reduction reactor without additional reducing gas, comprising the steps of:

gasifying the coal in the reactor together with the carbon dioxide produced during reduction to form iron, reducing gas and excess reducing gas;

burning excess reducing gas in a combustion zone separated from the reduction zone of the reactor; feeding back the heat produced via a heat exchanger to the gas present in the reduction chamber of the reactor to cover the enthalpy demand of the reactions taking place in the chamber;

constructing the heat exchanger as a high-temperature heat exchanger; and circulating the gas from the reduction chamber by forced circulation through the heat exchanger and into the reduction chamber to improve the heat transfer to the iron ore and the coal.

2. The method according to claim 1, further comprising the steps of:

burning a portion of the gas conveyed out of the reduction chamber and storing the heat produced and absorbing the heat stored in the combustion process by the other portion of the gas conveyed out of the reduction chamber; and then feeding back the heat with the other portion of gas into the reduction chamber.

3. The method according to claim 1 further comprising the steps of:

cooling the reducing gas after emerging from the reduction chamber; storing the heat produced during cooling temporarily; and conveying the cooled gas via forced circulation means before the cooled gas absorbs the heat produced in the combustion process.

4. The method according to claim 3, further comprising the step of:

using at least one part of the temporarily stored heat for heating one of the air needed for the combustion process and the oxygen needed for the combustion process.

5. The method according to claim 1, further comprising the step of:

carrying out the coal gasification and the iron reduction in immediate spatial proximity.

6. The method according to claim 1, further comprising the step of:

mixing the coal and the ore with one another prior to gasification and reduction.

7. The method for extraction of iron by direct reduction of iron ores using coal, the step comprising:

using a reduction chamber for the gasification of coal and the reduction of the ore to form iron;

connecting a combustion chamber to the reduction chamber;

forming some reducing gas and forming some excess gas not required for the reduction during gasification;

extensively combusting the excess gas in the combustion chamber, returning the heat produced during combustion with the aid of at least one heat exchanger, said heat exchanger constructed as a regenerator having a storage mass;

storing the heat produced during combustion in the storage mass; and connecting a means of force circulation to the reduction chamber and the heat exchanger for the circulation of the reducing gas through the reduction chamber and the heat exchanger.

8. The method of claim 7 further comprising the steps of:

conveying hot gas from the combustion chamber through a first regenerator thereby cooling the hot gas and then passing it on to a waste gas unit.

9. The method of claim 8 further comprising the steps of:

conveying cooled reducing gas through a second regenerator and thereby heating the cooled reducing gas to an operating temperature of the reduction chamber and then blowing the heated reducing gas into the reduction chamber.

10. The method of claim 9 further comprising the steps of:

conveying ambient air at approximately room temperature through a third regenerator, heating up the ambient air and then conveying the heated ambient air into the combustion chamber.

11. The method of claim 10 further comprising the steps of:

sucking the gas from the reduction chamber via a fan through a fourth regenerator and then heating the gas from the reduction chamber through the second regenerator to the operating temperature of the reduction chamber and then blowing the heated gas into the reduction chamber.

12. The method of claim 7 further comprising the steps of:

providing four generators, wherein each regenerator exhibits the following steps one after the other:

conveying hot gas from the combustion chamber through the first regenerator thereby cooling the hot gas and then passing it on to a waste gas unit;

conveying cooled reducing gas through the second regenerator and thereby heating the cooled reducing gas to an operating temperature of the reduction chamber and then blowing the heated reducing gas into the reduction chamber;

conveying ambient air at approximately room temperature through the third regenerator, heating up the ambient air and then conveying the heated ambient air into the combustion chamber, and sucking the gas from the reduction chamber via a fan through the fourth regenerator and then heating the gas from the reduction chamber through the second regenerator to the operating temperature of the reduction chamber and then blowing the heated gas into the reduction chamber.

* * * * *